United States Patent
Maskrot et al.

(10) Patent No.: US 12,121,839 B2
(45) Date of Patent: Oct. 22, 2024

(54) METALLIC FILTER WITH MICROSTRUCTURED ARCHITECTURE OF CONTROLLED POROSITY AND PROCESS FOR MANUFACTURING SUCH A FILTER

(71) Applicant: COMMISSARIAT A L'ENERGIE ATOMIQUE ET AUX ENERGIES ALTERNATIVES, Paris (FR)

(72) Inventors: Hicham Maskrot, Montlhéry (FR); Olivier Hercher, Fontenay-lès-Briis (FR); Frédéric Schuster, Saint-Germain-en-Laye (FR); Alexandre Michau, Bures-sur-yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/063,045

(22) Filed: Dec. 7, 2022

(65) Prior Publication Data

US 2023/0182052 A1 Jun. 15, 2023

(30) Foreign Application Priority Data

Dec. 10, 2021 (FR) ...................................... 2113277

(51) Int. Cl.
*B01D 46/00* (2022.01)
*B01D 39/20* (2006.01)
(Continued)

(52) U.S. Cl.
CPC ..... *B01D 46/0001* (2013.01); *B01D 39/2027* (2013.01); *B01D 39/2041* (2013.01);
(Continued)

(58) Field of Classification Search
None
See application file for complete search history.

(56) References Cited

U.S. PATENT DOCUMENTS

| 2017/0239726 A1 | 8/2017 | Palumbo et al. |
| 2020/0157657 A1* | 5/2020 | Qian ........................ B22F 9/24 |
| 2020/0306674 A1 | 10/2020 | Ota et al. |

FOREIGN PATENT DOCUMENTS

| FR | 3114514 A1 * | 4/2022 |
| WO | 2018/005315 A1 | 1/2018 |

OTHER PUBLICATIONS

Abdulkareem et al., "Silver and its application as an antimicrobial agent", Expert Opinion on Therapeutic Patents, vol. 15 Issue 2, Apr. 22, 2005, pp. 125-130. (Year: 2005).*

(Continued)

*Primary Examiner* — Xiaobei Wang
(74) *Attorney, Agent, or Firm* — Merchant & Gould P.C.

(57) ABSTRACT

A metallic filter (1) includes a microstructured architecture (2) defined in a three-dimensional space having orthogonal axes, microstructured architecture (2) includes a metallic network (10) formed by a plurality of longitudinal connecting strands (12), namely extending along a longitudinal axis direction (X), and a network (20) of pores formed of a plurality of longitudinal interstices (22) located along connecting strands (12). Each longitudinal interstice corresponding to a subset of pores (24) of the network (20) of pores. The subset of pores (24) for which the pores are aligned along the longitudinal axis (X), the longitudinal interstices (22) thereby defining an axis of anisotropy of the microstructured architecture.

7 Claims, 3 Drawing Sheets

(51) Int. Cl.
   *B22F 3/11*    (2006.01)
   *B22F 10/25*   (2021.01)
   *B22F 12/17*   (2021.01)
   *B33Y 10/00*   (2015.01)
   *B33Y 80/00*   (2015.01)

(52) U.S. Cl.
   CPC ............ *B22F 3/1103* (2013.01); *B22F 10/25* (2021.01); *B22F 12/17* (2021.01); *B33Y 10/00* (2014.12); *B33Y 80/00* (2014.12); *B01D 2239/0442* (2013.01); *B01D 2239/10* (2013.01); *B01D 2275/30* (2013.01); *Y10T 428/12028* (2015.01); *Y10T 428/12042* (2015.01); *Y10T 428/12153* (2015.01)

(56) References Cited

OTHER PUBLICATIONS

Search Report for French Patent Application No. 2113277 (Jun. 29, 2022).

* cited by examiner

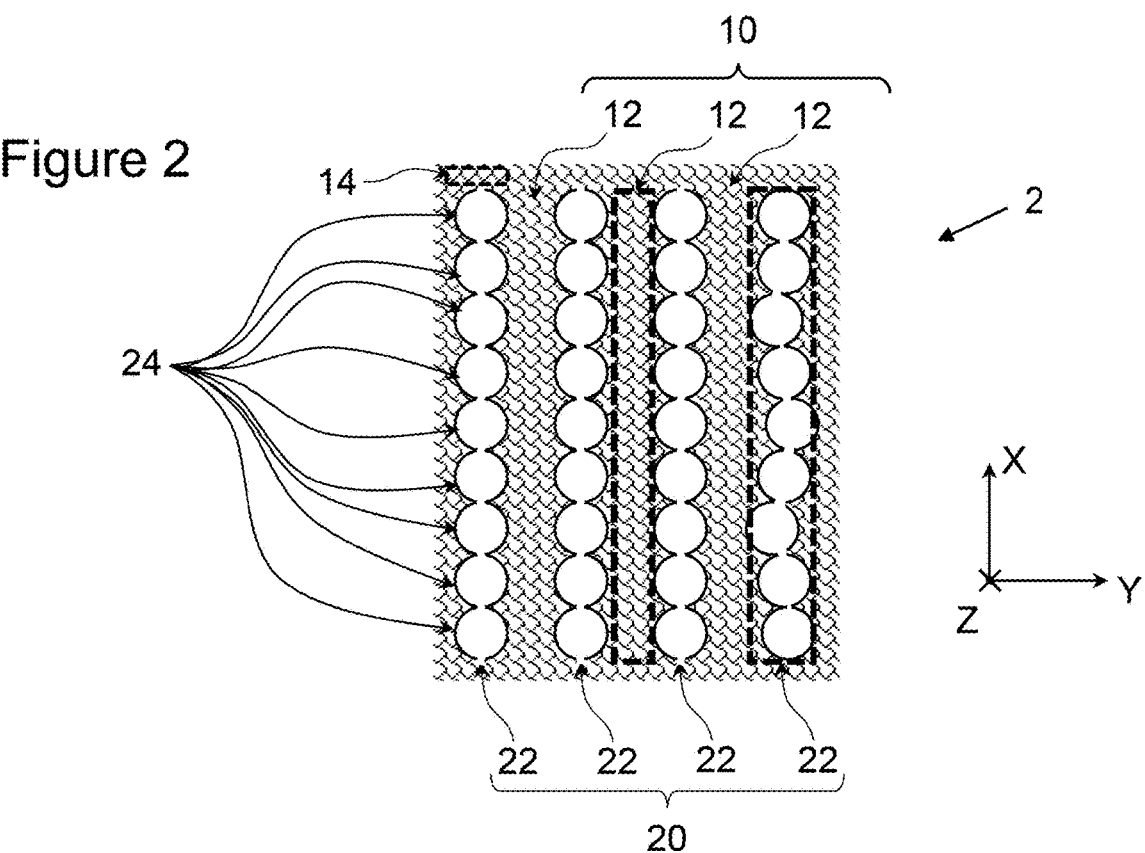
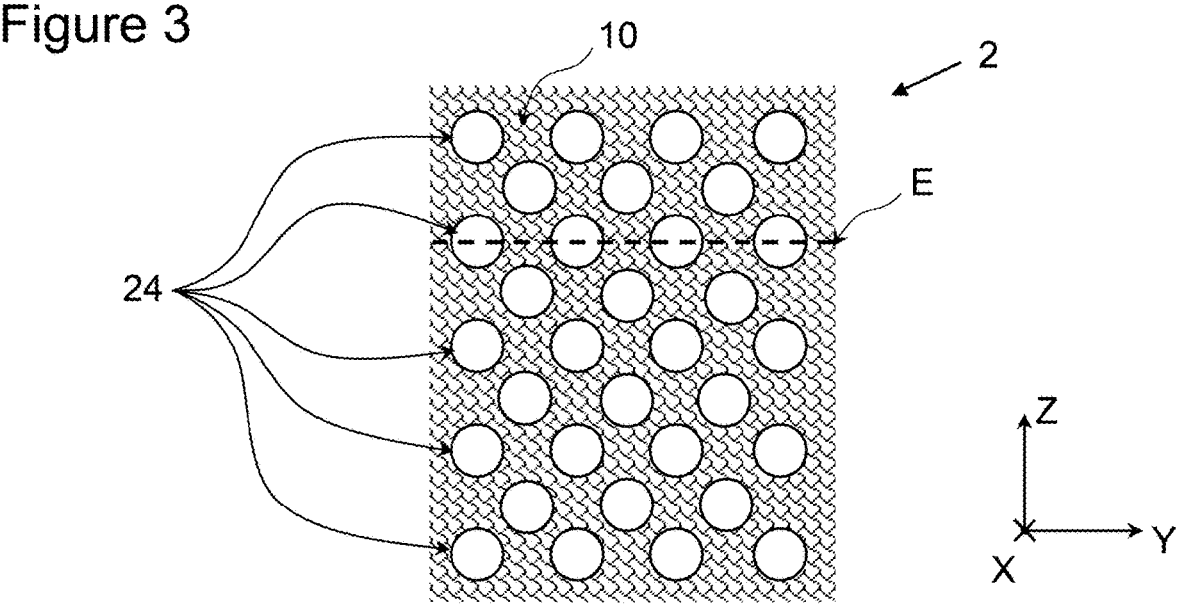

METALLIC FILTER WITH MICROSTRUCTURED ARCHITECTURE OF CONTROLLED POROSITY AND PROCESS FOR MANUFACTURING SUCH A FILTER

TECHNICAL FIELD OF THE INVENTION

The invention relates to metallic filters with microstructured architecture.

An architecture is said to be microstructured insofar as the main elements forming said architecture have micrometric dimensions, i.e., dimensions of less than 1000 μm, in at least two dimensions of space.

Such metallic filters are typically used to filter a fluid, liquid or gas, while being sufficiently permeable to allow at least part of said fluid to circulate.

The invention also relates to methods for manufacturing metallic filters with a microstructured architecture.

The invention finds its application in systems requiring the filtration of a fluid. For example, the invention can be used in a sanitary filtration system such as a sanitary filter or a sanitary mask. By way of example, the invention may also be used in gas diffusion plates. The invention can also be used in air pollution control systems or radioactive waste filtration systems.

TECHNICAL BACKGROUND

Since the spread of COVID-19, surgical and FFP1/FFP2 masks have become everyday consumer product for billions of people around the world. As these masks are inherently ephemeral and non-reusable, they currently represent a large source of potentially contaminated waste. Washing of surgical masks is not recommended by health authorities because of the loss of effectiveness that occurs when moisture is deposited on them during use. Furthermore, even if washing of masks were to be considered, it would have other environmental drawbacks as shown by the analysis of waste water in the city of Paris, for example. This analysis revealed the presence of traces of COVID-19 in this water. Thus, the problem would be shifted to managing the environmental consequences of washing millions of surgical masks.

One possible option to address these issues is to use sanitary masks with a longer shelf life.

In this respect, the metallic filters manufactured by powder sintering are already known. However, apart from the complexity of the sintering methods, they are also very expensive. In addition, the metallic filters obtained in this way can only be produced in limited shapes and have a heterogeneous porosity. This heterogeneous porosity makes it more difficult to achieve low pressure drop, i.e., low limitation of the speed with which the fluid passes through the filter, and at the same time efficient filtration. If one considers maximum filtration of small particles, i.e., grade 0.1 filtration in which more than 99% of particles larger than 100 nm are filtered, then the pressure drop is high. A compromise must therefore be found.

Homogeneous porosity filters with microstructured architecture manufactured by 3D printing have also been proposed (FIG. 1). However, such filters do not fully address the pressure drop issue when the filtration efficiency increases. Indeed, while it is easier to find a compromise between pressure drop and filtration efficiency, the pressure drop remains high.

SUMMARY OF THE INVENTION

The invention allows to overcome the aforementioned disadvantages and to this end proposes a metallic filter comprising a microstructured architecture defined in a three-dimensional space having orthogonal axes X, Y, Z, the microstructured architecture comprising:

a metallic network formed of a plurality of longitudinal connecting strands, namely extending along a longitudinal axis direction (axis X), and a network of pores formed of a plurality of longitudinal interstices located along connecting strands, each longitudinal interstice corresponding to a subset of pores of said network of pores, subset of pores for which the pores are aligned along the longitudinal axis X, the longitudinal interstices thereby defining an axis of anisotropy of the microstructured architecture.

Thus, in practice, within the network of pores, the pores are distributed such that an anisotropy of the microstructured architecture is achieved in the longitudinal axis direction X, with respect to the other two directions Y, Z.

The pores of a given interstice are generally parallel to the pores of another interstice and so on for all the interstices. The interstices in the network of pores are therefore generally parallel to each other. The porosity is therefore controlled within the microstructured architecture. The metallic filter according to the invention thus allows a low pressure drop while having a high filtration efficiency.

According to different characteristics of the invention which may be taken together or separately:

the pores have the same size;

the porosity is between 10% and 70%;

the connecting strands have a width of between 10 μm and 500 μm, and the longitudinal interstices have a width of between 1 μm and 100 μm;

the metallic filter has a thickness defined along the longitudinal axis of between 250 μm and 300 mm;

the metallic network is made of a metal selected from aluminium, nickel, cobalt, iron, copper, palladium, titanium, tungsten, silver or platinum, or an alloy of materials such as stainless steel, a metal alloy or a metal oxide;

the metallic filter further comprises two opposite main faces delimiting the microstructured architecture, said longitudinal faces being respectively covered with a thin virucidal or bactericidal layer.

The invention also relates to a functional part comprising a metallic filter according to the invention and a peripheral edge of zero porosity surrounding the microstructured architecture of the metallic filter.

The invention further relates to a method of additive manufacturing of a metallic filter as described above, said method of additive manufacturing comprising the following steps:

depositing a layer of metallic powder of a given material or of an alloy of materials on a support, said layer of metallic powder having a thickness of between 1 μm and 200 μm;

performing localised laser melting of the metal grains of the powder, at a temperature above the melting temperature of the material or alloy of materials forming said metallic powder deposited in the step of depositing the metallic powder layer and running a computer program so as to create a predetermined pattern of the microstructured architecture defined in a three-dimensional space having orthogonal axes X, Y, Z, the microstructured architecture comprising:

a metallic network formed of a plurality of longitudinal connecting strands, namely extending along a longitudinal axis direction (axis X), and a network of pores formed of a plurality of longitudinal interstices along connecting strands, each longitudinal interstice corresponding to a subset of pores of the network of pores, subset of pores for which the pores are aligned along the longitudinal axis X, the longitudinal interstices thereby defining an axis of anisotropy of the microstructured architecture.

The method according to the invention may comprise at least one of the following steps, taken alone or in combination:

the support is heated to a temperature strictly above ambient temperature and less than or equal to 250° C.;

the support is heated to a temperature of between 180° C. and 220° C., advantageously between 190° C. and 210° C.;

a volume energy density of the laser beam during the step of localized laser melting corresponds to 30% to 90% of the value of the volume energy density of the laser beam necessary to form a non-porous block from said metallic powder.

BRIEF DESCRIPTION OF THE FIGURES

Other objects and features of the invention will become clearer in the following description, made with reference to the attached figures, in which:

FIG. 2 is a schematic cross-sectional view of a metallic filter along a plane of direction vectors $\vec{X}$ and $\vec{Y}$ illustrating the microstructured architecture of a metallic filter according to an embodiment of the present invention;

FIG. 3 is a schematic cross-sectional view of a metallic filter along a plane of direction vectors $\vec{Y}$ and $\vec{Z}$ illustrating the microstructured architecture of a metallic filter according to an embodiment of the present invention;

DETAILED DESCRIPTION OF THE INVENTION

Figure 1:
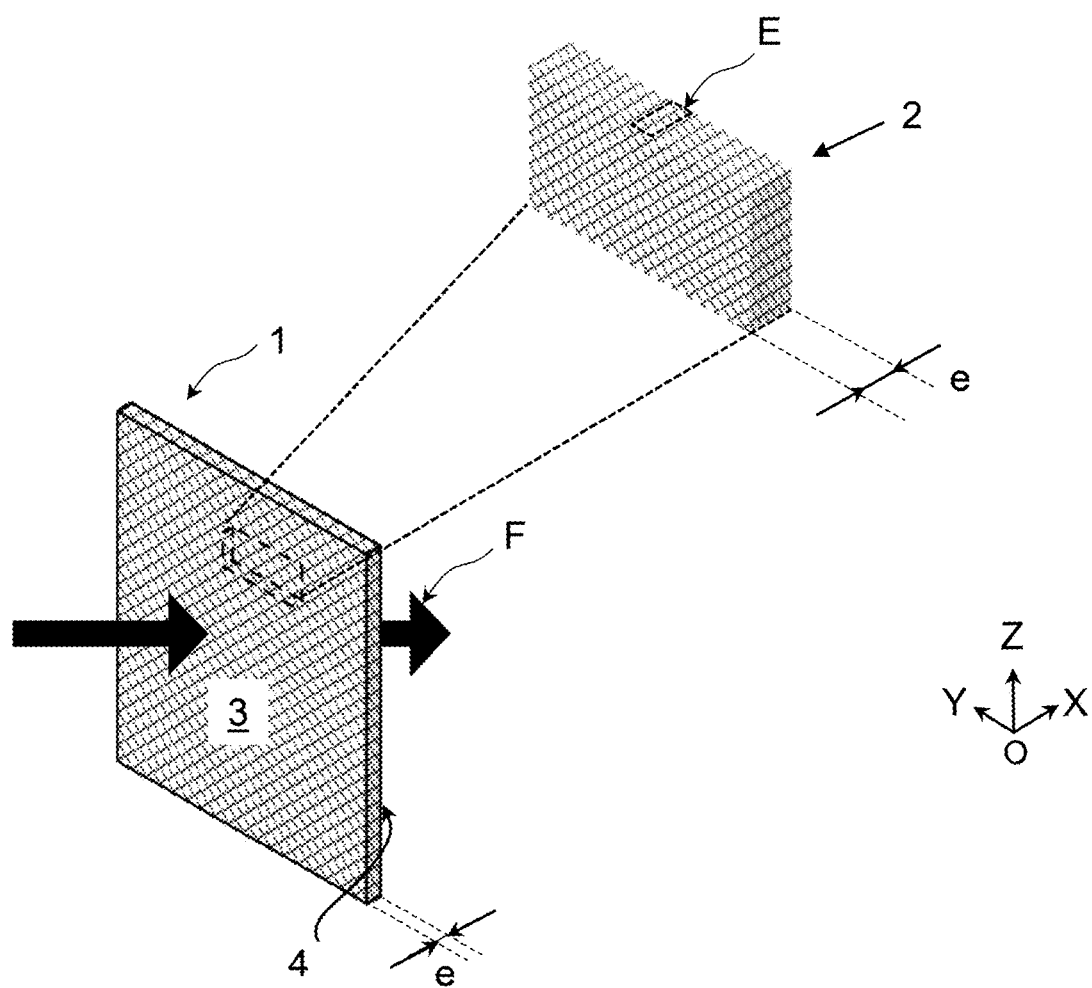
FIG. 1 is a schematic overall perspective view of a metallic filter according to an example embodiment of the present invention.

With reference to FIG. 1, the invention relates to a metallic filter 1 comprising a microstructured architecture defined in a three-dimensional space having orthogonal axes X, Y and Z.

The metallic filter 1 allows the filtration of a liquid or gaseous fluid F. For example, if the metallic filter is to be used as a sanitary mask, the fluid is the air exhaled and inhaled by an individual. This air may therefore be charged with droplets. The metallic filter 1 can be of any shape: it can be parallelepipedal as shown in FIG. 1, but also prismatic or polyhedral. The shape can be adapted as required.

Whatever the geometric shape chosen, it will be considered in the following that the fluid F moves in the direction of the thickness e of the metallic filter 1. The thickness e of the metallic filter corresponds to the smallest dimension of the metallic filter. In this case, it is therefore the distance between a first main face 3 and a second main face 4 of the metallic filter 1. In the example shown in FIG. 1, the thickness e is therefore defined in a longitudinal axis direction, this axis (axis X) being orthogonal to the main faces 3, 4. Thus, when the fluid F moves in the direction of the thickness e of the metallic filter 1, this means that it first passes through the first main face 3 of the metallic filter, then enters the metallic filter 1 and finally passes through the second main face 4 of said metallic filter in this order. It should be noted that this does not define the actual trajectory or movement dynamics of the fluid F outside or inside the metallic filter 1, but only the overall movement.

The metallic filter 1 comprises a microstructured architecture 2. The architecture 2 is said to be microstructured insofar as the main elements forming said architecture have micrometric dimensions, i.e., dimensions smaller than 1000 μm, in at least two dimensions of space. The main elements of the microstructured architecture are described below. First of all, it should be noted that the microstructured architecture 2 extends from the first main face 3 to the second main face 4. It may also be pointed out that the metallic filter may incorporate a functional part comprising a peripheral edge 32 surrounding the microstructured architecture 2. In other words, the functional part comprises the metallic filter 1 surrounded by the peripheral edge. The peripheral edge 32 has zero porosity (i.e., equal to 0), i.e., it is non-porous. This enhances the mechanical strength of the metallic filter 1 as a whole and facilitates its integration into a method for manufacturing the functional part.

With reference to FIG. 2, the microstructured architecture 2 comprises a metallic network 10 formed by a plurality of connecting strands 12 extending in a longitudinal axis direction (axis X). The cross-sectional plane of the microstructured architecture 2 shown in FIG. 2 is orthogonal to the main faces 3,4 of the metallic filter 1. This plane is a subspace of the previously introduced space X, Y, Z of direction vectors X and Y. It corresponds, for example, to the surface E in perspective which is delimited by dashed lines in FIG. 1. The cross-sectional plane in FIG. 2 is also illustrated by a dashed line E in FIG. 3 (it is normal to the page). Each connecting strand 12 is an elongated structure with a filament-like appearance and non-linear contours. As will be discussed in more detail below, the connecting strands 12 are formed by localised laser melting of grains of a metallic powder. The connecting strands 12 are micrometric in size in at least two spatial directions which implies, in practice, that they are substantially disc-shaped with a micrometric diameter in a cross-sectional plane transverse to their length.

Advantageously, the metallic network 12 may comprise material bridges 14 ensuring the cohesion of the metallic strands 12. The material bridges 14 allow the metallic network 10 to form an integral assembly.

The microstructured architecture 2 also comprises a network 20 of pores 24 delimiting the connecting strands 12. The pores 24 have the usual meaning given to them in the prior art and correspond to the empty spaces left within a porous material. FIG. 2 is a schematic illustration of the microstructured architecture 2. Thus, contrary to what is illustrated, the pores 24 may have different shapes from one another even if, as will be explained below, their distribution and size are controlled. Indeed, the pores 24 also result from the localised melting of the grains of the metallic powder, except that they are the indirect consequence thereof.

The network 20 of pores 24 comprises a plurality of longitudinal (axis X) interstices 22 corresponding to subsets of pores 24. More specifically, these are subsets of pores 24 located along connecting strands 12. Incidentally, each longitudinal interstice 22 corresponds to a subset of pores 24 located between connecting strands 12 located side by side but not directly in contact with each other. While each pore 24, taken individually, has micrometric dimensions, the longitudinal interstices 22 have a significantly larger dimension than the other dimensions, which gives them an elongated shape.

According to the invention, the longitudinal interstices 22 are all oriented along the same direction X, which is not the case in the other directions Y, Z, resulting in an anisotropy of the microstructured architecture. Incidentally, the longitudinal interstices 22 are parallel to each other along this longitudinal direction. This anisotropy is illustrated schematically in FIG. 2, which shows the distribution of pores in the plane of direction vectors $\vec{X}$ and $\vec{Y}$. The longitudinal axis X may be called the axis of anisotropy in the following.

Of course, the direction of each longitudinal interstice 22, considered in isolation, corresponds to the line parallel to the longitudinal axis passing through the centres of the pores 24 forming that longitudinal interstice 22. The direction of a longitudinal interstice 22 is therefore necessarily dependent on the arrangement of the subset of pores 24 forming it.

However, it should be noted that the pores 24 of a longitudinal interstice 22 do not necessarily always follow a perfect alignment. This is illustrated, for example, for the longitudinal interstice 22 shown in the dotted line on the right in FIG. 2. The direction of the longitudinal interstice 22 thus corresponds to the straight line of direction defined by the longitudinal axis X passing through a midpoint (x:y), the ordinate y of which is the median of the ordinates of the centres of the pores 24.

This anisotropy allows to obtain a microstructured architecture 2 having a controlled porosity, the porosity being controlled by a controlled distribution of the pores 24 in longitudinal interstices 22 as defined above. When the fluid F passes through the metallic filter 1, it is constrained by the microstructuring of the microstructured architecture 2 while having a flow facilitated by the presence of the longitudinal interstices 22. The invention thus allows to obtain a high filtration efficiency while having a low pressure drop. The circulation of the fluid F within the microstructured architecture is thus improved.

Advantageously, the pores 24 of the network of pores 20 have substantially the same size. Thus, in addition to the distribution of the pores 24, the porosity of the microstructured architecture 2 can also be controlled due to a homogeneous size of the pores. It will be readily understood that, insofar as the longitudinal interstices 22 define an anisotropy of the microstructured architecture along the longitudinal axis direction (axis X) and when the pores 24 are all of the same size in the microstructured architecture 2, it is possible to control very precisely the filtration efficiency and at the same time the pressure drop, depending on the application envisaged, by varying only the size of the pores 24. It should be remembered, however, that the pores 24 are of micrometric size.

FIG. 3 illustrates the microstructured architecture 2 in a plane parallel to the main faces 3,4 of the metallic filter 1. This plane is a subspace of the previously introduced space X, Y, Z, of direction vectors $\vec{Y}$ and $\vec{Z}$. As is better seen in this figure, each interstice 22, of which only one pore 24 is shown in each case in FIG. 3, is generally surrounded by four connecting strands 12, two by two located side by side. The same applies to each connecting strand 12, which is generally surrounded by four longitudinal interstices 22, depending on the example. However, the distribution of the pores 24 as illustrated in FIG. 3 is not mandatory and other distributions may be considered subject to the following.

Within the network of pores, the pores 24 are distributed in such a way that anisotropy is obtained in the longitudinal axis direction X with respect to the other two directions Y, Z. The distribution of the pores 24 favours the movement of the fluid F through the longitudinal interstices 22, which are thus configured to facilitate the movement of the fluid F with respect to the other directions.

Preferably, the porosity (or porosity rate) of the microstructured architecture 2 is between 10% and 70%. This allows to obtain a permeability of between 11 and 200 $l \cdot m^{-2} \cdot s^{-1}$ for a pressure drop between the main faces 3, 4 of approximately 100 Pascals. The aforementioned range of porosity is particularly suitable for sanitary filtration masks such as those described in the preamble of the present description. However, the higher the porosity, the lower the pressure drop and vice versa. Other applications may be envisaged within the scope of the present invention.

Preferably, the connecting strands 12 have a width of between 10 μm and 500 μm while the longitudinal interstices 22 have a width of between 1 μm and 100 μm. In the attached diagrams, the width is taken along the axis Y, orthogonal to the longitudinal axis. This does not refer to the largest dimension of the connecting strands 12 and the longitudinal interstices 22. Such parameters allow to obtain a microstructuring of the architecture 2 appropriate for the type of filtration desired.

Particularly advantageously, the thickness e of the metallic filter 1, i.e., the smallest dimension of the metallic filter 1, extends along the axis X of anisotropy. When the metallic filter 1 has this configuration, the fluid F moves in a preferred direction which is also the smallest dimension of the metallic filter. There is therefore less friction within the microstructured architecture 2, with the result that the movement dynamics of the fluid F within the microstructure is mainly guided by the anisotropic distribution of the longitudinal interstices 22 and the size of pores 24. The pressure drop experienced by the fluid F as it passes through the metallic filter 1 and the filtration efficiency are further controlled.

The thickness e of the metallic filter 1 is preferably between 250 μm and 300 mm. In practice, it will depend essentially on the application considered. For a sanitary filtration mask, a thickness of between 400 μm and 2 mm, for example, would be chosen. If the metallic filter 1 according to the invention is used in the manufacture of functional parts such as air filters with high treatment efficiency generally used in an treatment device of the air or a pollution control device, its thickness may be much greater.

The metallic network 10 is made of a metal in pure form, or in the form of an alloy of metals or metal oxides, the metal(s) being selected from aluminium, stainless steel, nickel, cobalt, iron, copper, palladium, titanium, tungsten, silver and platinum. These metals are not only solid at ambient temperature, but they are also good candidates for microstructuring by laser melting. In addition, they have good mechanical properties and are suitable for thin film deposition.

In this respect, the metallic filter 1 may furthermore comprise a virucidal or bactericidal thin layer covering the main faces 3, 4 of the metallic filter 1. Depending on the deposition technique envisaged, this thin layer may extend over a certain pore depth from the main faces 3, 4. This virucidal or bactericidal thin layer is a barrier layer for infectious micro-organisms such as bacteria and viruses. For example, such a thin layer may be made of a pure metal, an alloy of metals or metal oxides such as titanium, copper, zinc, nickel or silver.

Other practical features may be added to the metallic filter 1 to enhance its properties through this or an additional thin layer. For example, the thin layer may allow the microstructured architecture 2 to be hydrophilic on one of the main faces 3, 4 while being hydrophobic on the other of the main faces 3, 4. This may in particular allows to control the humidity of a functional part equipped with such a metallic filter.

The invention also relates to a method of additive manufacturing of a metallic filter 1 as previously described.

A first step 110 of the method of additive manufacturing according to the invention consists of depositing at least one layer of metallic powder of a given material, or of an alloy of materials, on a support. Each layer of metallic powder has a thickness which may be between 1 µm and 200 µm. Advantageously, each layer of powder has a thickness of between 1 µm and 150 µm, between 1 µm and 120 µm or even more precisely between 10 µm and 120 µm. Typically, a layer with a thickness of approximately 30 µm, 50 µm or 100 µm can be used.

The support can be heated to a temperature strictly above ambient temperature and less than or equal to 250° C. Advantageously, the support can more precisely be heated to a temperature of between 180° C. and 220° C., and even more advantageously between 190° C. and 210° C. This increases the adhesion to the substrate and structurally stabilises the layer thus formed. The finished product is therefore less fragile.

A second step of the method of additive manufacturing according to the invention consists in carrying out a localised laser melting of the metallic grains of the powder, at a temperature higher than the melting temperature of the given material, or of the given alloy of materials, forming said metallic powder deposited during step 110. The laser melting carried out under these conditions allows a localised energy supply under the action of a laser beam, which allows to melt the grains of the powder in a localised manner.

This localised, and therefore selective, melting is carried out by means of a computer program which creates a predetermined pattern M of the microstructured architecture 2 from a pre-established computer database.

Figure 4:
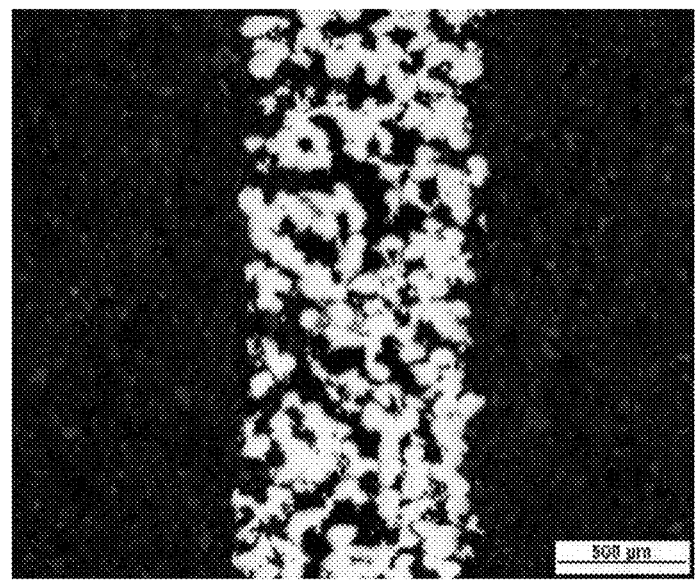
FIG. 4 is an image of a microstructured architecture according to the prior art.
Figure 5:
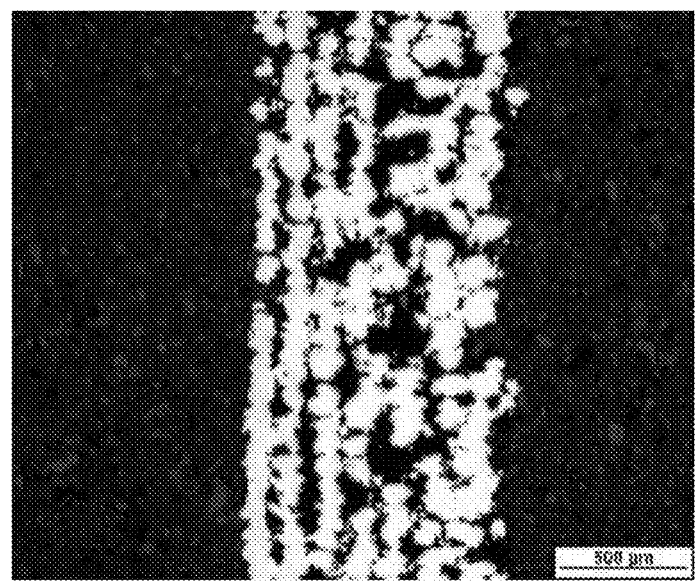
FIG. 5 is an image of a microstructured architecture according to the invention.

FIG. 5 is an image of a microstructured architecture 2 according to the invention. The anisotropy of the longitudinal interstices 22 can be seen, which are all parallel to each other in a given direction. On the contrary, in a microstructured architecture obtained by a method according to the prior art as illustrated in FIG. 4, the pores are distributed according to an isotropic distribution.

It may be necessary to repeat steps 110 and 120 several times to form connecting strands 12 of the appropriate dimensions.

In each laser melting step, the path adopted by the laser beam comprises displacement vectors where the displacement vectors are spatially offset in pairs by an offset value and the pore rate of the pores within the metallic filter 1 is adjusted, for a given laser beam power and layer thickness, by adapting said offset value, the pore rate increasing as the offset value increases. The offset value HD, which affects the manufactured metallic filter 1.

In this respect, the volume energy density of the laser beam at each pass during the laser melting step, at the level of the microstructured architecture 2, is between 30% and 90% of a volume energy density value of the laser beam necessary to obtain a non-porous block from said metallic powder. In order to adapt this volume energy density, a laser power can be set, for example, by acting on the other parameters: HD, V and $e_C$. Reference can be made to the mathematical formula (F1) below which defines these parameters.

The computer program, with the aid of the database, controls the displacement of the laser beam with respect to the metallic powder deposited during step 110, according to at least one of the parameters selected from among:
- a relative trajectory between the laser beam and the previously deposited metallic material powder,
- a speed of displacement "V" corresponding to a relative speed between the laser beam and the previously deposited metallic material powder,
- a power of the laser beam "P",
- a volumetric energy density of the laser beam "E".

The volumetric energy density E of the laser beam, expressed in J/mm³, is defined by the following mathematical formula (F1):

$$E = \frac{P}{V \cdot HD \cdot e_C} \tag{F1}$$

Where: P is the laser beam power, expressed in watts (W), V is the speed of displacement of the laser beam, expressed in mm/s, HD is an offset value between two adjacent application vectors of the laser beam, expressed in mm, and $e_C$ is the layer thickness, expressed in mm, E is the volume energy density of the laser beam.

This three-dimensional additive manufacturing solution by depositing successive layers and then melting them by laser according to pre-established and computer-controlled trajectories is known as "SLM" technology, which stands for "Selective Laser Melting", which can also be expressed as "localised laser melting".

In an SLM additive method, the operations are carried out in a neutral gas environment (generally argon), where a thin layer of metallic powder is spread on a metal substrate. The laser beam then provides the powder with the energy necessary to melt it and, adhere it to the lower layers selectively according to the geometry of the part. The repetition of these actions allows the manufacture of metal parts with complex geometry in three dimensions. In order to do this, it is necessary to prepare the "computer-aided control" type file of the part by cutting it into slices of the thickness of the desired manufacturing layer to make a set of two-dimensional plans. In addition, it is necessary to create holding supports and assign a set of parameters that will allow the trajectories of the laser beam on the powder to be defined. All of these operations result in a file that is transmitted and drives the manufacturing machine.

Other methods of additive manufacturing of materials could be envisaged, such as the technology known as "SLS", which stands for "Selective Laser Sintering", which can also be expressed as "localised laser sintering". There are other techniques.

Finally, it is possible to provide, within the scope of the invention, a step of depositing a thin layer interposed between a step 120 of melting by laser and the step 110 of depositing a layer of metallic powder if a functionality requires it. Other modifications of the method may be provided in order to functionalise the successive layers thus formed.

PRACTICAL IMPLEMENTATION OF THE METHOD ACCORDING TO THE INVENTION

According to a particular implementation example, the method comprises the following steps:

during step 110, a metallic powder of thickness equal to 50 µm is deposited on the support;

step 120 is carried out with a laser beam of power equal to 275 W, an offset value HO fixed at 0.1 mm or 0.12 mm and a lower threshold of the speed of displacement of the laser beam being (with respect to the powder bed) between 1500 and 6000 mm/s.

In the scope of this implementation example, it was possible to demonstrate an increase in the porosity rate within the microstructured architecture, above a lower threshold of speed of displacement, as the speed of displacement increased.

It could therefore also be shown that the porosity rate of the pores within the microstructured architecture 2 can be adjusted, by adapting the volume energy density of the laser beam. Indeed, the porosity rate increases, below an upper threshold of volumetric energy density, as the volumetric energy density decreases.

In this respect, according to a particular implementation example, the method comprises the following steps:

in step 110, a metallic powder with a thickness equal to 50 µm is deposited on the support;

step 120 is carried out with a laser beam of power equal to 275 W, an upper threshold of the energy density of the laser beam can vary between 7 J/mm$^3$ and 80 J/mm$^3$ and more specifically in this example between 7 J/mm$^3$ and 30 J/mm$^3$ (in particular depending on the offset value HD: 0.1 mm or 0.12 mm).

Tests were carried out using a 316L stainless steel powder marketed by SLM Solutions®. These are the results shown in FIGS. 4 and 5. The metallic material can also be aluminium or an aluminium alloy, which have the advantage of being light and thermally stable at disinfection temperatures.

The invention claimed is:

1. A metallic filter comprising a microstructured architecture defined in a three-dimensional space having axes orthogonal to each other, the microstructured architecture comprising:

a metallic network formed of a plurality of longitudinal connecting strands extending along a longitudinal axis direction, and a network of pores formed of a plurality of longitudinal interstices located along connecting strands, each longitudinal interstice corresponding to a subset of pores of said network of pores, the subset of pores having the pores aligned along the longitudinal axis, the longitudinal interstices thereby having a same alignment as an axis of anisotropy of the microstructured architecture, wherein the pores have a same size.

2. The metallic filter according to claim 1, wherein the porosity is between 10% and 70%.

3. The metallic filter according to claim 1, wherein the connecting strands have a width of between 10 µm and 500 µm, and the longitudinal interstices have a width of between 1 µm and 100 µm.

4. The metallic filter according to claim 1, having a thickness defined along the longitudinal axis of between 250 µm and 300 mm.

5. The metallic filter according to claim 1, wherein the metallic network is made of a metal selected from aluminium, nickel, cobalt, iron, copper, palladium, titanium, tungsten, silver, or platinum, or of an alloy of materials selected from stainless steel, metal alloy, or metal oxide alloy.

6. The metallic filter according to claim 1, further comprising two opposite main faces delimiting the microstructured architecture, said faces being respectively covered with a thin virucidal or a bactericidal layer.

7. A functional part comprising a metallic filter according to claim 1 and a peripheral edge of zero porosity surrounding at least certain surfaces of the microstructured architecture of the metallic filter.

\* \* \* \* \*